United States Patent Office 3,219,320
Patented Nov. 23, 1965

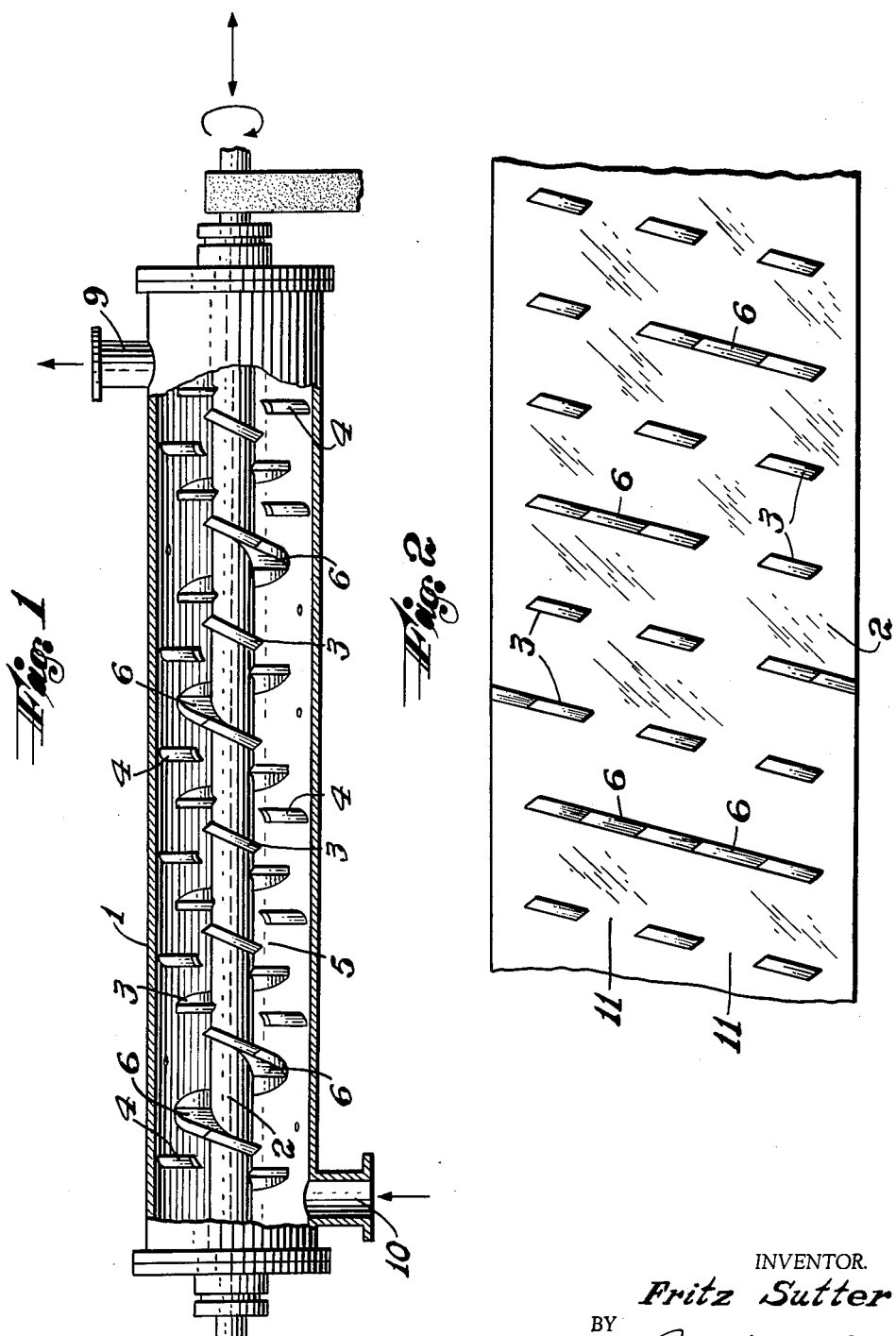

3,219,320
MIXING AND KNEADING DEVICE
Fritz Sutter, Grossemattstrasse 56, Pratteln, Switzerland
Filed Sept. 19, 1963, Ser. No. 310,054
Claims priority, application Germany, Sept. 28, 1962,
B 69,012
1 Claim. (Cl. 259—5)

This invention relates to a mixing and kneading device and more particularly to the type of such devices wherein a screw conveyor is used, the thread of which is spacedly and radially slotted so that the screw thread of the conveyor becomes a series of vanes. The vanes are provided on the shaft of the conveyor but are disconnected from each other.

Arrangements wherein conveyor or worm vanes cooperate with kneading teeth interiorly mounted on the housing of the device are already known. The disadvantage of these arrangements consists in that the optimum kneading effect cannot be achieved in all cases with the worms screw conveyors used since their conveying effect cannot be adapted to varying specific volumes during the kneading process. During working of materials whose specific volumes change during the kneading operation, the performance of the worm is determined by the maximum volume, which ordinarily enters the machine. During the subsequent treatment, the materials are compacted, but the performance of the worm remains below the optimum value.

My invention provides a screw conveyor type of mixing and kneading device, the screw or worm of which, provided with interrupted worm vanes, carries out a rotating and simultaneously oscillating movement. The invention consists in that the conveying performance of the worm may be adapted to the specific volume of the materials to be worked, which is done by varying the ratio between the worm vanes and the gaps between them. Changes in the conveying performance are effected by reducing the gaps between adjacent vanes.

My device possesses a rotating and simultaneously oscillating worm which consists of worm vanes separated from one another by gaps and cooperating with kneading teeth arranged in the worm housing. The arrangement is characterised in that thread-closing or gap-filling elements which serve to close the worm vane gaps are present.

The invention will now be further explained with reference to an embodiment thereof illustrated in the accompanying drawing, wherein:

FIGURE 1 shows a longitudinal section through a continuously working mixing and kneading arrangement, and FIGURE 2 shows the diagrammatic representation of the development of the worm.

Referring to the drawing in greater detail, the device as shown in FIG. 1 possesses a worm housing 1 with an entry pipe 10 and exit pipe 9. In the housing 1 a worm shaft 2 is mounted for rotation and movement back and forth in the axial direction. The drive of the shaft is effected by a special gearing which is not shown in detail in the drawing.

The shaft 2 is provided with a discontinuous screw thread so that individual screw or worm vanes 3 are created which are separated from one another by gaps 11. The invention provides thread-closing or gap-filling elements 6 which are shaped to fit into the gaps 11 when they are introduced between adjacent vanes 3 and secured in their place. They may, for instance, be fastened to the shaft by means of screws passing through the shaft.

The housing 1 is further provided on its inner wall with teeth 4 which are so arranged that during the rotary and reciprocating movements of the shaft 2 together with its worm vanes and thread-closing elements they will always extend into gaps 5. While each of the gaps 11 is between two adjacent vanes and may be filled by a gap-filling element 6, each gap 5 is between two adjacent turns of the screw thread.

Different specific volumes of the materials to be treated in mixing and kneading devices call for different machine designs as far as the number of vanes and thus the spacing between the vanes are concerned (a specific volume is the volume of the weight unit). The present invention makes it possible to adjust one and the same design to a wide variety of specific volumes by a corresponding employment of gap-filling elements. The output of my device increases in the same measure as gaps 11 are filled with gap-filling elements 6. If according to the invention some of the gaps 11 are to be closed, gap-filling elements 6 are used for such purpose. If an element 6 would interfere with a tooth 4, the tooth is to be removed prior to the introduction of the element.

If a purchaser of my mixing and kneading device wishes to use a machine for a single purpose only, the machine may have fixedly attached thread-closing elements, for instance, by welding. If a machine is to be used for two outputwise different purposes, the thread-closing elements are used in a detachable fashion. It may also happen that a user wishes to adjust his machine to changed conditions during operation. For instance, if material is treated which undergoes a very great change in volume during operation, then the operation can be stopped and one or more thread-closing elements can be put in place. With the device of the invention, the output, compared with that of known constructions, can be increased considerably and the kneading effect can be influenced greatly.

What I claim is:
A mixing and kneading device comprising
 (a) a longitudinally extending housing,
 (b) means on said housing for charging and discharging the material to be treated,
 (c) a screw conveyor journalled in said housing for rotation and longitudinal reciprocation with respect to said housing, the helical thread of said conveyor being spacedly provided with cutouts and thus being divided into vanes spacedly arranged along a helix,
 (d) teeth releasably mounted on the inner wall of said housing so as to extend toward gaps between two adjacent vanes, and
 (e) elements shaped to fill a gap between two adjacent vanes when placed therebetween, said gap-filling elements being selectively and releasably mounted between pairs of adjacent vanes.

References Cited by the Examiner
UNITED STATES PATENTS

| 2,020,878 | 11/1935 | Doering | 259—99 |
| 2,731,247 | 1/1956 | Hudry | 18—125 |
| 3,023,455 | 3/1962 | Geier et al. | 259—6 X |

FOREIGN PATENTS

| 278,575 | 2/1952 | Switzerland. |

CHARLES A. WILLMUTH, *Primary Examiner.*